United States Patent
Hsu

(10) Patent No.: US 11,544,012 B2
(45) Date of Patent: Jan. 3, 2023

(54) DISTRIBUTED STORAGE SYSTEM AND DATA SYNCHRONIZATION METHOD APPLIED THERETO

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/500,069

(22) Filed: Oct. 13, 2021

(65) Prior Publication Data

US 2022/0121370 A1    Apr. 21, 2022

(30) Foreign Application Priority Data

Oct. 15, 2020  (TW) ................................. 109135682

(51) Int. Cl.
*G06F 3/06* (2006.01)

(52) U.S. Cl.
CPC ............ *G06F 3/067* (2013.01); *G06F 3/0604* (2013.01); *G06F 3/0655* (2013.01)

(58) Field of Classification Search
None
See application file for complete search history.

(56) References Cited

U.S. PATENT DOCUMENTS

| | | | |
|---|---|---|---|
| 2018/0316758 A1 | 11/2018 | Golander et al. | |
| 2019/0146936 A1* | 5/2019 | Williams | G06F 3/0644 710/5 |
| 2020/0125582 A1 | 4/2020 | O'Shaughnessy | |
| 2020/0311015 A1* | 10/2020 | Xu | G06F 9/5022 |

FOREIGN PATENT DOCUMENTS

| | | |
|---|---|---|
| TW | 201937375 | 9/2019 |
| TW | 202026905 | 7/2020 |

* cited by examiner

*Primary Examiner* — Brian R Peugh
(74) *Attorney, Agent, or Firm* — WPAT, PC

(57) ABSTRACT

A distributed storage system and a data synchronization method are used with a network. The system includes a first network host and a second network host. A first file system directly writes data generated by the first network host into a first software-simulated persistent memory. The data in the first software-simulated persistent memory is stored into a first remote block device and cached, respectively. The cached data is stored into a first persistent storage by asynchronous writeback mechanisms. The first remote block device transmits the received data to the second software-simulated persistent memory through the network. The data transmitted to the second software-simulated persistent memory is cached, and the cached data is stored into a second persistent storage by asynchronous writeback mechanisms. The second network host replaces the first network host to provide services when the first network host is out of service.

18 Claims, 4 Drawing Sheets

US 11,544,012 B2

DISTRIBUTED STORAGE SYSTEM AND DATA SYNCHRONIZATION METHOD APPLIED THERETO

FIELD OF THE INVENTION

The present disclosure relates to a distributed storage system and a data synchronization method applied to the distributed storage system, and particularly to a distributed storage system used with the Internet and a data synchronization method applied to the distributed storage system.

BACKGROUND OF THE INVENTION

With the development of the Internet, many services are provided on remote network hosts. For providing uninterrupted service, a remote backup network host should be activated to take the work immediately after a network host in use is out of order. To ensure that the remote backup network host has the latest data upon replacing the failed network host, data synchronization between the network hosts is necessary. A common data synchronization technology is distributed replicated block device (DRBD).

Please refer to FIG. 1, which is a block diagram illustrating that the distributed replicated block device is used in dual-node high availability (HA) clusters. In the system, a first persistent storage 110 is provided for the first network host 11 to store data generated or received by the network host 11. Similarly, a second persistent storage 120 is provided for the second network host 12 to store data generated or received by the network host 12. Each of the first persistent storage 110 and the second persistent storage 120 is implemented by a hard disk drive (HDD), a solid-state drive (SSD), other type of non-volatile memory device or a virtual device created in the physical memory device(s).

For explaining the remote backup service, suppose that the second network host 12 serves as the remote backup network host of the first network host 11. To keep data synchronization between the two network hosts 11 and 12, once the application program 111 executed in the first network host 11 generates a record of data and the data is transmitted to the first distributed replicated block device 113 through the file system 112, the first distributed replicated block device 113 transmits the data to both the first persistent storage 110 and a first remote block device 114 constructed by software. Therefore, the first persistent storage 110 gets the data. The first remote block device 114 further transmits the data to the second network host 12 through a data transmission path along a first network stack & driver 115 (constructed by software), a first network interface device 116 and a second network interface device 126. Then, the data is further transmitted to and stored in the second persistent storage 120 through a second network stack & driver 125 and a second distributed replicated block device 123 of the second network host 12 to update the stored data. After that, both the first persistent storage 110 and the second persistent storage 120 obtain the record of data, and data synchronization between the first persistent storage 110 and the second persistent storage 120 is achieved. The functions of the application program 121, the file system 122 and the second remote block device 124 in the second network host 12 may refer to similar components in the first network host 11.

A memory cache mechanism is used in the present operating system to increase the read and write speed of the file system, and such mechanism results in new problem unfortunately. For example, it is a common design in the present operation system to provide a first page cache module 117 and a second page cache module 127 implemented by random access memories (RAM). Such design can decrease the access frequency to the traditional hard disk drives having lower data read/write speed so as to raise the efficiency of data access. The file system 112 first writes the data generated by the application program 111 into the first page cache module 117. Then, the data is temporarily stored for rapid access as required by the application program 111. After a period of time, the file system 112 takes the data from the first page cache module 117 and writes the data into the first distributed replicated block device 113, and the data is transferred to the first persistent storage 110 and the second persistent storage 120 to finish the update. If the first network host 11 stops working (e.g. power failure or system crash) during the caching period, the data has not been written into the first distributed replicated block device 113 yet so that the data in the persistent storages 110 and 120 are not updated to the latest data, and thus causes data loss. In this situation, the second network host 12 does not obtain the complete data from the first network host 11 because the cache data is not stored in the second persistent storage 120 in time. Even though the first network host 11 for the services is rapidly replaced with the second network host 12, the second network host 12 might not provide complete services.

It is desired to overcome the problem of data loss without affecting the access efficiency of the system.

SUMMARY OF THE INVENTION

An aspect of the present disclosure provides a distributed storage system used with a network. The distributed storage system includes a first network host and a second network host. The first network host executes a first DAX-enabled file system, a first software-simulated persistent memory and a first remote block device, and includes a first persistent storage and a first network module. The first DAX-enabled file system directly writes first data generated by the first network host into the first software-simulated persistent memory. A first copy and a second copy of the first data in the first software-simulated persistent memory are saved/stored into the first remote block device and cached, respectively. The first remote block device receives and transmits the first copy of the first data to a remote end through the first network module and the network in communication with the first network module. The cached data of the second copy of the first data is stored into the first persistent storage by asynchronous writeback mechanisms. The second network host executes a second DAX-enabled file system, a second software-simulated persistent memory and a second remote block device, and includes a second persistent storage and a second network module. The first copy of the first data is transmitted to the second software-simulated persistent memory as a third copy of the first data through the network and the second network module in communication with the network. The third copy of the first data in the second software-simulated persistent memory is cached and then the cached data of the third copy of the first data is stored into the second persistent storage by asynchronous writeback mechanisms. The second network host replaces the first network host to restore services originally provided by the first network host when the first network host is out of service.

Another aspect of the present disclosure provides a data synchronization method used with a network and applied to the above distributed storage system. In the data synchronization method, the first DAX-enabled file system directly writes first data generated by the first network host into the first software-simulated persistent memory. A first copy and a second copy of the first data are generated when the first file system writes the first data into the first software-simulated persistent memory. The first copy of the first data is saved/stored into the first remote block device, and the second copy of the first data is cached. The first remote block device receives and transmits the first copy of the first data through the first network module and the network in communication with the first network module. The cached data of the second copy of the first data is stored into the first persistent storage by asynchronous writeback mechanisms. The first copy of the first data is transmitted to the second software-simulated persistent memory as a third copy of the first data through the network and the second network module in communication with the network. The third copy of the first data stored in the second software-simulated persistent memory is cached and then the cached data of the third copy of the first data is stored into the second persistent storage.

A further aspect of the present disclosure provides a data synchronization method used with a network and applied to the above distributed storage system. In the data synchronization method, the first DAX-enabled file system directly writes first data generated by the first network host into the first software-simulated persistent memory as first persistent memory data. After the first data is written into the first software-simulated persistent memory as the first persistent memory data, the first persistent memory data is cached as first cache memory data. Then, the first cache memory data is stored into the first persistent storage by asynchronous writeback mechanisms. The first remote block device receives the first persistent memory data as remote block device data after the first data is written into the first software-simulated persistent memory as the first persistent memory data, and transmits the remote block device data to the second software-simulated persistent memory through the first network module, the network and the second network module. The remote block device data is stored in the second software-simulated persistent memory as second persistent memory data, and the second persistent memory data is cached as second cache memory data. Then, the second cache memory data is stored into the second persistent storage by asynchronous writeback mechanisms.

According to the present disclosure, the data loss of cached data can be avoided whiling maintaining the access efficiency of the system.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
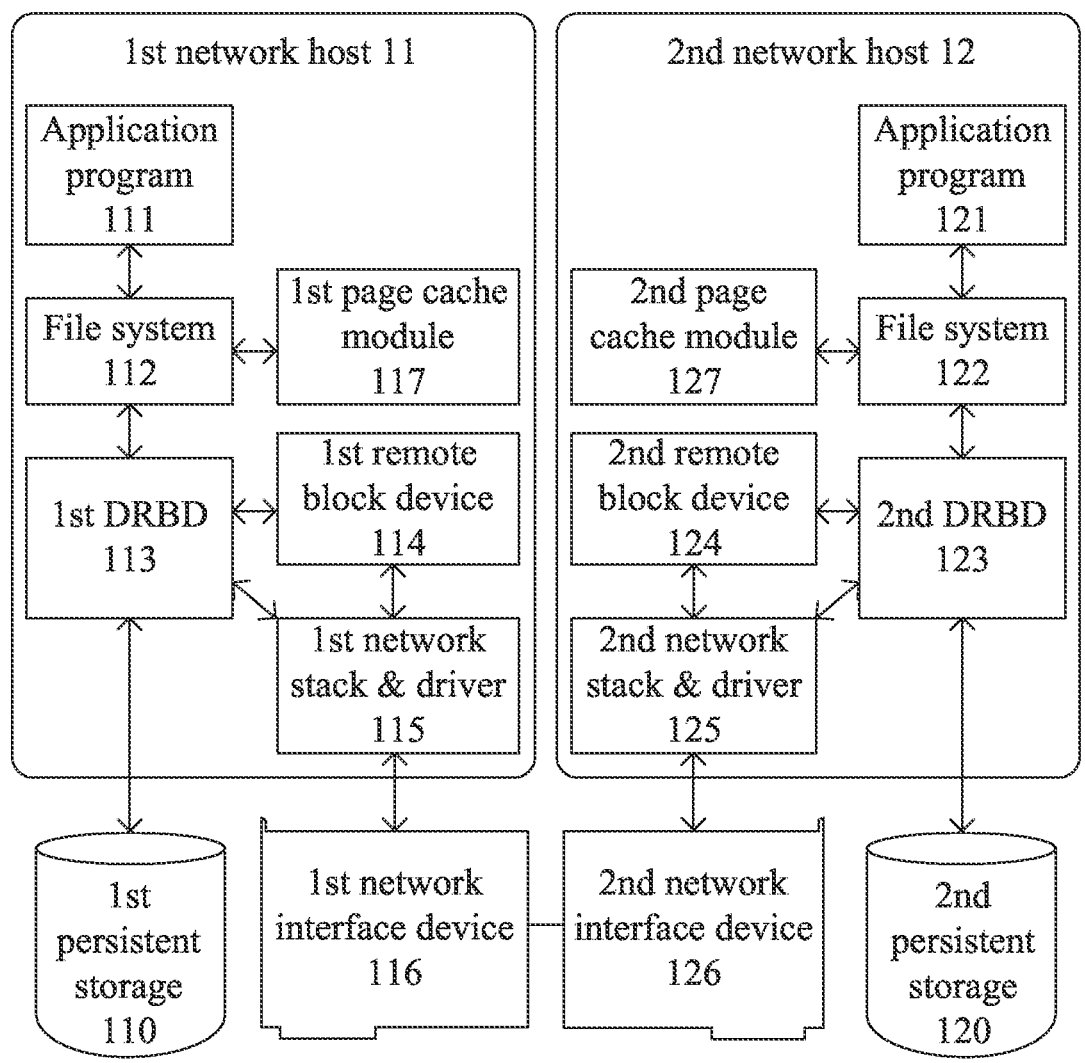
FIG. 1 is a block diagram illustrating that a distributed replicated block device is used in dual-node high availability clusters.
Figure 2:
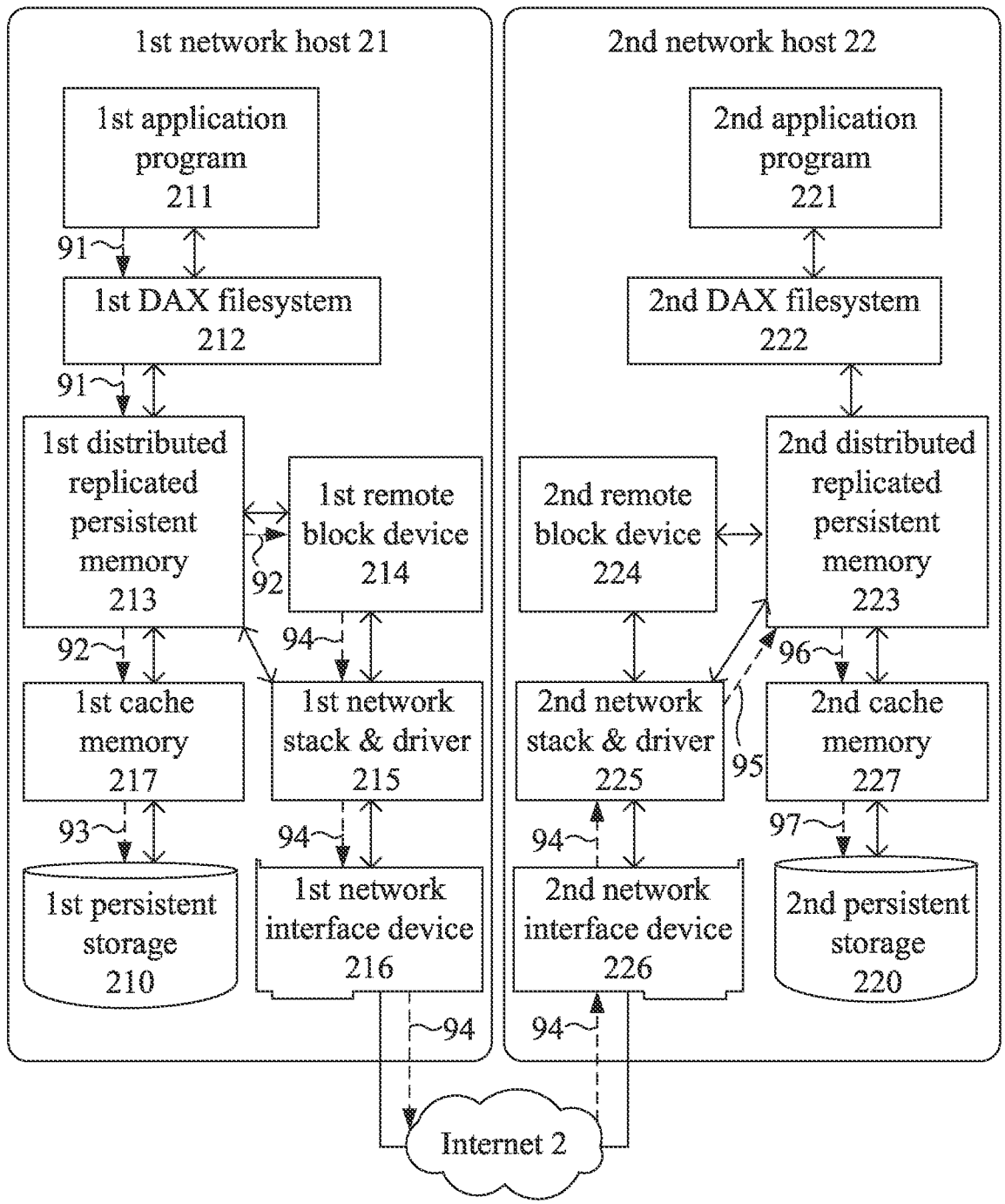
FIG. 2 is a block diagram illustrating a distributed storage system using a data synchronization method according to an embodiment of the present disclosure.

Please refer to FIG. 2, which is a block diagram illustrating a distributed storage system using a novel data synchronization method according to an embodiment of the present disclosure. The description is related to a distributed storage system applied to dual-node high availability clusters. The first persistent storage 210 is assigned to the first network host 21 to store data generated by the first network host 21 or transferred from a remote end to the first network host 21. The second persistent storage 220 is assigned to the second network host 22 to store data generated by the second network host 22 or transferred from a remote end to the second network host 22. In the embodiment, the second network host 22 servers as the remote backup network host of the first network host 21. A heartbeat protocol could be used between the two network hosts to monitor host health of the first network host 21. The first persistent storage 210 and the second persistent storage 220 could be implemented by hard disk drives (HDD), solid-state drives (SSD) or other types of rewritable non-volatile memory devices. To enhance fault tolerance and system stability, a third or more network hosts (not shown) can be introduced in the system by applying the concepts given in the following description.

Persistent memory (PMem) technology (e.g. Intel Optane DC persistent memory) is developed and it is useful in the present system. The persistent memory combines advantages of flash memory and dynamic random-access memory (DRAM). Concretely, the persistent memory is non-volatile because it can retain stored data even after power is removed. In addition, the persistent memory has DRAM-like access speed (e.g. faster than three times of flash memory speed) and low latency (e.g. less than one-tenth of flash memory latency). In an operating system, a file system can be designed to access the persistent memory based on a direct access mode, and the cache memory could be omitted. The operating system, e.g. Linux, provides the fourth extended filesystem (ext4) with direct access (DAX) function to enhance the flexibility of the file system. In other words, the file system does not have to perform page caching, and memory store operation to the persistent memory is adopted instead.

The present disclosure creates a first DAX filesystem 212 in the first network host 21. The DAX filesystem or DAX-enabled file system means a file system supporting direct access function. For example, in Linux, the DAX filesystem could be a fourth extended filesystem or a XFS file system. The distributed replicated block device in the prior arts is replaced with a distributed replicated persistent memory in the present disclosure.

The first distributed replicated persistent memory 213 is a software-simulated persistent memory, and the first DAX filesystem 212 can perform direct access to read data from or write data into the first distributed replicated persistent memory 213. As indicated by the dashed arrow 91, the first DAX filesystem 212 writes the data generated by the first application program 211 into the first distributed replicated persistent memory 213 through memory store operations. The file system does not use the page caching mechanisms to cache data, and hence data loss due to any unexpected event can be avoided.

To keep the efficiency as page caching is used, a first cache memory 217 is introduced between the first distributed replicated persistent memory 213 (provided through software simulation) and the first persistent storage 210. After the first DAX filesystem 212 writes one record of data into the first distributed replicated persistent memory 213, the data is duplicated and two copies of the data are transmitted to the first remote block device 214 and the first cache memory 217, respectively (as indicated by the dashed arrows 92). For illustration purposes, the data transmitted from the first distributed replicated persistent memory 213 to the first remote block device 214 and the first cache memory 217 is called persistent memory data (arrow 92) herein.

Please see the transmission path related to the first remote block device 214 first. After receiving the persistent memory data, the first remote block device 214 immediately transmits the received data to the second network host 22 at a remote end through a first network module (e.g. the combination of the first network stack & driver 215 and the first network interface device 216 in the diagram) and the network (e.g. the Internet 2 in the diagram). Then, the second network host 22 transmits the data to the second network stack & driver 225 through the second network interface device 226 of the second network module (as indicated by the dashed arrows 94). Afterwards, the second network stack & driver 225 writes the data into the second distributed replicated persistent memory 223 which is also provided through software simulation (as indicated by the arrow 95). For illustration purposes, the data transmitted from the first remote block device 214 to the second network host 22, particularly to the second distributed replicated persistent memory 223, is called remote block device data (arrows 94 and 95). Now, the data is stored in both the first distributed replicated persistent memory 213 and the second distributed replicated persistent memory 223. Therefore, the two network hosts have the latest data to achieve data synchronization.

Please see another transmission path related to the first cache memory 217 which is provided by the system memory and configured by software. The data is stored or saved into the first cache memory 217 by using a STORE command (as indicated by the dashed arrow 92). The data is temporarily stored (cached) in the first cache memory 217. For illustration purposes, the data stored in and transmitted from the first cache memory 217 is called cache memory data (arrow 93) herein. When the first application program 211 requests the data from the first distributed replicated persistent memory 213 through the first DAX filesystem 212 based on the direct access mode, the first cache memory 217 allows rapid access to the data stored therein. Also, the cache memory data temporarily stored (cached) in the first cache memory 217 is transferred to the first persistent storage 210 to perform asynchronous writeback mechanisms. For example, the operating system (not shown) uses the data newly stored in the first cache memory 217 to update the data in the first persistent storage 210 (as indicated by the arrow 93) at predetermined time intervals or at the time that new cache memory data exceeds a predetermined threshold so that the cache memory data can be correctly stored in the first persistent storage 210 without affecting the access efficiency and schedule.

Similarly, the second cache memory 227 is provided by the system memory and configured by software. After the second distributed replicated persistent memory 223 receives the remote block device data and transmits the data (called persistent memory data herein for illustration purposes) to the second cache memory 227, the data is stored or saved into the second cache memory 227 by using a STORE command (as indicated by the dashed arrow 96). For illustration purposes, the data stored in and transmitted from the second cache memory 227 is called cache memory data (arrow 97). Then, the operating system stores the new cache memory data into the second persistent storage 220 at predetermined time intervals or at the time that the changes exceed a predetermined threshold (as indicated by the arrow 97). Thus, the latest data is stored in the remote backup network host. Therefore, even though the cached data is missing, a copy has been reserved in the remote network host. The distributed storage system remains high access efficiency as adopting data caching and reduces data loss probability.

It is to be noted that the terms "persistent memory data", "remote block device data" and "cache memory data" in the specification are used for indicating the corresponding source or path of the data. These data may represent similar data contents in similar or different data formats.

Figure 3:
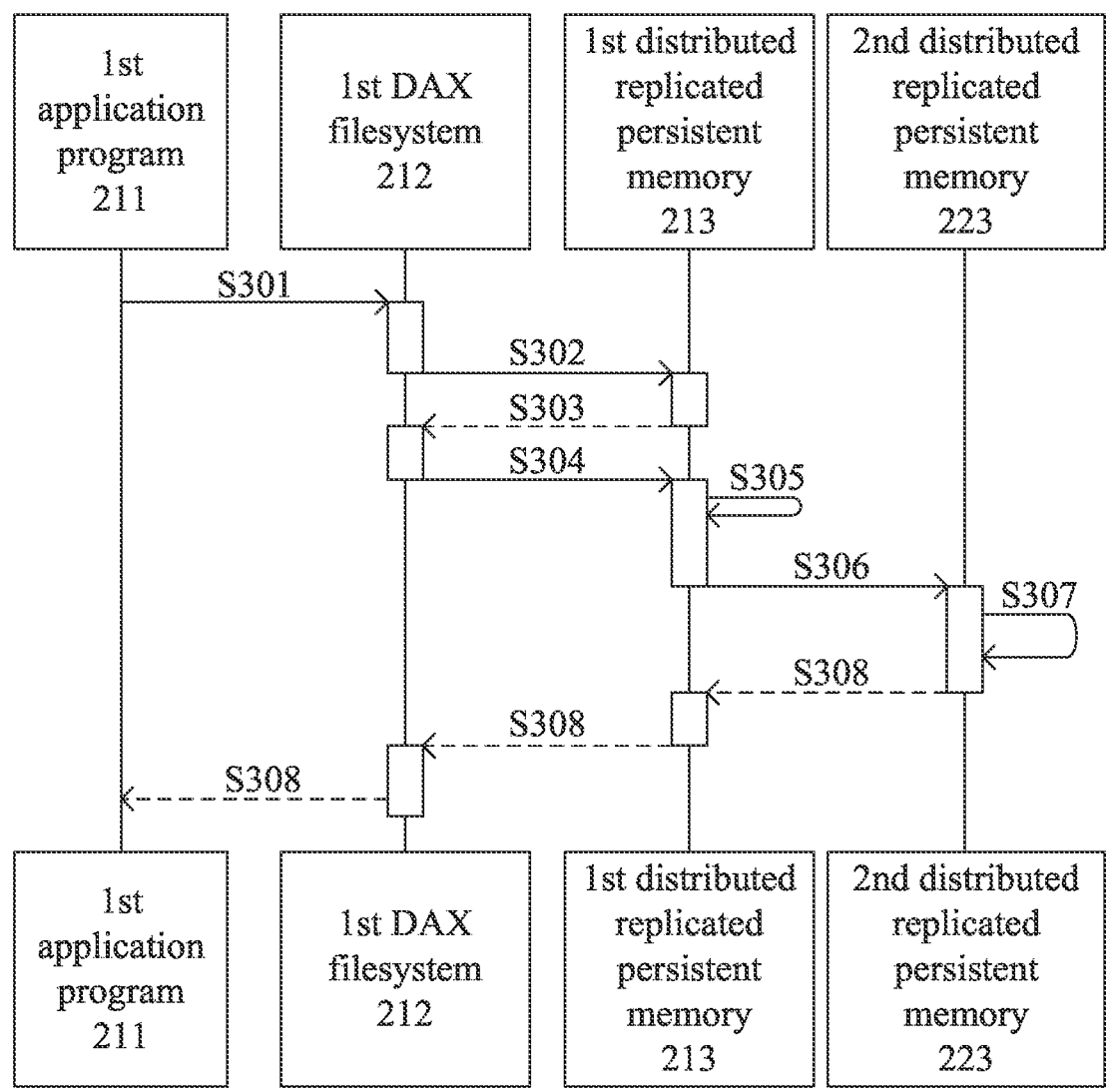
FIG. 3 is a sequence diagram showing a memory write method applied to the distributed storage system according to the present disclosure.

Please refer to FIG. 3, which is a sequence diagram showing a memory write method applied to the distributed storage system according to an embodiment of the present disclosure. In the embodiment, the first application program 211 would write designated data to a file. At first, the first application program 211 sends the designated data to the first DAX filesystem 212 (step S301). After receiving the designated data, the first DAX filesystem 212 (e.g. a fourth extended filesystem or a XFS file system) sends a request asking for a page or pages in the first cache memory 217 to the first distributed replicated persistent memory 213 (step S302). Then, the first distributed replicated persistent memory 213 responds to the request with page address information of the first cache memory 217 (step S303). After that, the first DAX filesystem 212 writes the designated data into the page(s) of the first cache memory 217 indicated by the page address information (step S304) and marks the page(s) as dirty page(s) (step S305). Additionally, the first distributed replicated persistent memory 213 transmits the designated data to the second distributed replicated persistent memory 223 at the remote end through a data transmission path (e.g. the first remote block device 214, the first network module (including the first network stack & driver 215 and the first network interface device 216), the Internet, and the second network module (including the second network interface device 226 and the second network stack & driver 225) in FIG. 2) (step S306). The second distributed replicated persistent memory 223 is provided through software simulation. Afterwards, the second distributed replicated persistent memory 223 writes the designated data into the second cache memory 227 managed by the second distributed replicated persistent memory 223 (step S307). After the designated data is written into the second cache memory 227, the second distributed replicated persistent memory 223 sends a complete signal to notify the first application program 211 through the above-described data transmission path in a reverse direction to finish the data-write action (step S308). Therefore, as the distributed storage system performs the memory write method, the data are also synchronized to reduce data loss possibility.

Figure 4:
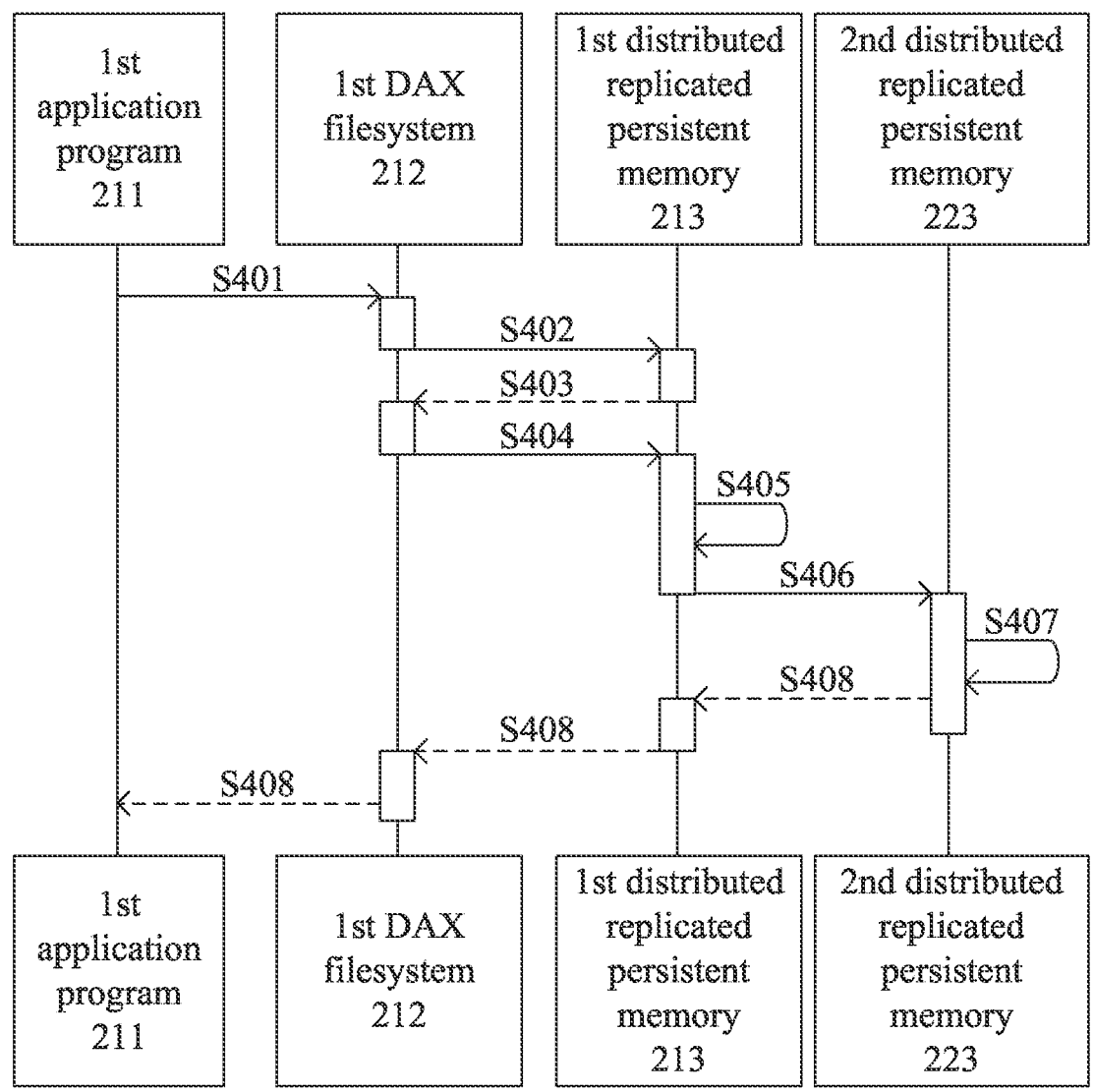
FIG. 4 is a sequence diagram showing a memory mapping method for synchronizing data in two network hosts according to an embodiment of the present disclosure.

Please refer to FIG. 4, which is a sequence diagram showing a memory mapping method for synchronizing data in two network hosts according to an embodiment of the present disclosure. At first, the first application program 211 lunches a msync system call in order to flush a memory-mapped file (step S401). After receiving the msync system call, the first DAX filesystem 212 (e.g. a fourth extended filesystem or a XFS file system) asks the first distributed replicated persistent memory 213 about the address of sync range in the first cache memory 217 (step S402), the first distributed replicated persistent memory 213 responds with the address information of the sync range in the first cache memory 217 (step S403). Then, the first DAX filesystem 212 performs persistent memory flushing according to the address information of the sync range (step S404) to write the complete data of the dirty page(s) (i.e. the memory-mapped file) of the first cache memory 217 into the first persistent storage 210 (step S405). Thus, the first persistent storage 210 obtains the updated data. Additionally, the first distributed replicated persistent memory 213 transmits the complete data of the memory-mapped file (i.e. the data of the dirty page(s) of the first cache memory 217) to the second distributed replicated persistent memory 223 at the remote end through a data transmission path (e.g. the first remote block device 214, the first network module (including the first network stack & driver 215 and the first network interface device 216), the Internet 2, and the second network module (including the second network interface device 226 and the second network stack & driver 225) in FIG. 2) (step S406). The second distributed replicated persistent memory 223 is implemented through software simulation. Afterwards, the second distributed replicated persistent memory 223 writes the received data into the second cache memory 227 managed by the second distributed replicated persistent memory 223, and the data is further synchronized to the second persistent storage 220 (step S407). After the synchronization, the second distributed replicated persistent memory 223 sends a complete signal to notify the first application program 211 through the above-described data transmission path in a reverse direction to finish the data-synchronizing action (step S408). Therefore, as the distributed storage system of the present disclosure performs the memory mapping method, the data synchronization between the first network host 21 and the second network host 22 can be achieved so as to reduce the data loss possibility.

In conclusion, the present disclosure can update the data in the remote network host (or called secondary network host) in time to have a complete and consistent backup in the remote network host and overcome the problem of data loss. The remote network host can take over the services from the local network host (or called primary network host) subject to a scheduled or disruptive event rapidly to provide uninterrupted service because of the complete and consistent backup. Therefore, the remote network host can completely replace the local network host to restore the services originally provided by the local network host which is out of service now. Still, the distributed storage system adopting the cache memory keeps high access efficiency according to the concepts of the present disclosure.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A distributed storage system used with a network, comprising:
    a first network host executing a first direct access-enabled file system, a first software-simulated persistent memory and a first remote block device and comprising a first persistent storage and a first network module, wherein the first direct access-enabled file system directly writes first data generated by the first network host into the first software-simulated persistent memory; a first copy and a second copy of the first data in the first software-simulated persistent memory are stored into the first remote block device and cached, respectively; the first remote block device receives and transmits the first copy of the first data to a remote end through the first network module and the network in communication with the first network module; and the cached data of the second copy of the first data is stored into the first persistent storage by asynchronous write-back mechanisms; and
    a second network host executing a second direct access-enabled file system, a second software-simulated persistent memory and a second remote block device and comprising a second persistent storage and a second network module, wherein the first copy of the first data is transmitted to the second software-simulated persistent memory as a third copy of the first data through the network and the second network module in communication with the network; the third copy of the first data in the second software-simulated persistent memory is cached and the cached data of the third copy of the first data is stored into the second persistent storage by asynchronous writeback mechanisms; and the second network host replaces the first network host to restore services originally provided by the first network host when the first network host is out of service.

2. The distributed storage system according to claim 1, wherein the first network host further executes a first application program and implements a first cache memory; the first application program generates the first data; the first direct access-enabled file system is a first DAX filesystem supporting direct access functionality; the first software-simulated persistent memory is a first distributed replicated persistent memory; and the second copy of the first data is cached in the first cache memory and the cached data of the second copy of the first data is stored into the first persistent storage later.

3. The distributed storage system according to claim 2, wherein after the first DAX filesystem receives the first data, the first DAX filesystem sends a request for a page of the first cache memory to the first distributed replicated persistent memory; the first distributed replicated persistent memory responds to the request with page address information of the first cache memory; and the first DAX filesystem writes the first copy of the first data into the page of the first cache memory indicated by the page address information.

4. The distributed storage system according to claim 2, wherein the second network host further executes a second application program and implements a second cache memory; the second application program is identical to the first application program; the second direct access-enabled file system is a second DAX filesystem identical to the first direct access-enabled file system and supporting direct access functionality; the second software-simulated persistent memory is a second distributed replicated persistent memory; and the third copy of the first data is cached in the second cache memory and the cached data of the third copy of the first copy of the first data is stored into the second persistent storage later.

5. The distributed storage system according to claim 4, wherein the second distributed replicated persistent memory sends a complete signal to the first application program after the second distributed replicated persistent memory writes the third copy of the first data into the second cache memory.

6. The distributed storage system according to claim 1, wherein
the first network module comprises:
a first network stack & driver in communication with the first software-simulated persistent memory and the first remote block device; and
a first network interface device in communication with the first network stack & driver and the network, and
the second network module comprises:
a second network stack & driver in communication with the second software-simulated persistent memory and the second remote block device; and
a second network interface device in communication with the second network stack & driver and the network.

7. The distributed storage system according to claim 1, wherein an application program launches a msync system call; the first direct access-enabled file system writes second data which is stored in the first software-simulated persistent memory into the first persistent storage in response to the msync system call, and the second data is transmitted to the second software-simulated persistent memory through the network and the second network module in communication with the network; and the second data in the second software-simulated persistent memory is cached and the cached second data is stored into the second persistent storage.

8. The distributed storage system according to claim 1, wherein the network is Internet, and the first persistent storage and the second persistent storage are implemented by non-volatile memory devices.

9. A data synchronization method used with a first network host, a second network host and a network, the first network host executing a first direct access-enabled file system, a first software-simulated persistent memory and a first remote block device and comprising a first persistent storage and a first network module, the second network host executing a second direct access-enabled file system, a second software-simulated persistent memory and a second remote block device and comprising a second persistent storage and a second network module, the data synchronization method comprising steps of:
the first direct access-enabled file system directly writes first data generated by the first network host into the first software-simulated persistent memory;
generating a first copy and a second copy of the first data when the first direct access-enabled file system writes the first data into the first software-simulated persistent memory;
storing the first copy of the first data into the first remote block device and caching the second copy of the first data;
the first remote block device receiving and transmitting the first copy of the first data through the first network module and the network in communication with the first network module;
storing the cached data of the second copy of the first data into the first persistent storage by asynchronous write-back mechanisms;

transmitting the first copy of the first data to the second software-simulated persistent memory as a third copy of the first data through the network and the second network module in communication with the network; and
caching the third copy of the first data stored in the second software-simulated persistent memory and storing the cached data of the third copy of the first data into the second persistent storage.

10. The data synchronization method according to claim 9, wherein the first network host further executes a first application program and implements a first cache memory; the first application program generates the first data of the first network host; the first direct access-enabled file system is a first DAX filesystem supporting direct access functionality; the first software-simulated persistent memory is a first distributed replicated persistent memory; and the second copy of the first data is cached in the first cache memory and the cached data of the second copy of the first data is stored into the first persistent storage later.

11. The data synchronization method according to claim 10, wherein after the first DAX filesystem receives the first data, the first DAX filesystem sends a request for a page of the first cache memory to the first distributed replicated persistent memory; the first distributed replicated persistent memory responds to the request with page address information of the first cache memory; and the first DAX filesystem writes the second copy of the first data into the page of the first cache memory indicated by the address information.

12. The data synchronization method according to claim 10, wherein the second network host further executes a second application program and implements a second cache memory; the second application program is identical to the first application program; the second direct access-enabled file system is a second DAX filesystem identical to the first direct access-enabled file system and supporting direct access functionality; the second software-simulated persistent memory is a second distributed replicated persistent memory; and the third copy of the first data is cached in the second cache memory and the cached data of the third copy of the first data is stored into the second persistent storage later.

13. The data synchronization method according to claim 12, wherein the second distributed replicated persistent memory sends a complete signal to the first application program after the second distributed replicated persistent memory writes the third copy of the first data into the second cache memory.

14. The data synchronization method according to claim 9, wherein the first network host launches a msync system call; the first direct access-enabled file system writes second data which is stored in the first software-simulated persistent memory into the first persistent storage in response to the msync system call, and the second data is transmitted to the second software-simulated persistent memory through the network and the second network module in communication with the network; and the second data in the second software-simulated persistent memory is cached and the cached second data is stored into the second persistent storage.

15. The data synchronization method according to claim 9, wherein the network is Internet, and the first persistent storage and the second persistent storage are implemented by non-volatile memory devices.

16. A data synchronization method used with a first network host, a second network host and a network, the first network host executing a first direct access-enabled file system, a first software-simulated persistent memory and a first remote block device and comprising a first persistent storage and a first network module, the second network host executing a second direct access-enabled file system, a second software-simulated persistent memory and a second remote block device and comprising a second persistent storage and a second network module, the data synchronization method comprising steps of:

the first direct access-enabled file system directly writing first data generated by the first network host into the first software-simulated persistent memory as first persistent memory data;

caching the first persistent memory data as first cache memory data after the first data is written into the first software-simulated persistent memory as the first persistent memory data;

storing the first cache memory data into the first persistent storage by asynchronous writeback mechanisms;

the first remote block device receiving the first persistent memory data as remote block device data after the first data is written into the first software-simulated persistent memory as the first persistent memory data, and transmitting the remote block device data to the second software-simulated persistent memory through the first network module, the network and the second network module;

storing the remote block device data in the second software-simulated persistent memory as second persistent memory data and caching the second persistent memory data as second cache memory data; and storing the second cache memory data into the second persistent storage by asynchronous writeback mechanisms.

17. The data synchronization method according to claim 16, wherein the first network host further executes a first application program and implements a first cache memory; the first application program generates the first data of the first network host; the first direct access-enabled file system is a first DAX filesystem supporting direct access functionality; the first software-simulated persistent memory is a first distributed replicated persistent memory; and the first persistent memory data is cached in the first cache memory as the first cache memory data.

18. The data synchronization method according to claim 17, wherein the second network host further executes a second application program and implements a second cache memory; the second application program is identical to the first application program; the second direct access-enabled file system is a second DAX filesystem identical to the first direct access-enabled file system and supporting direct access functionality; the second software-simulated persistent memory is a second distributed replicated persistent memory; and the second persistent memory data is cached in the second cache memory as the second cache memory data.

* * * * *